United States Patent
Sakamoto

(10) Patent No.: US 11,891,081 B2
(45) Date of Patent: Feb. 6, 2024

(54) WARNING APPARATUS

(71) Applicant: DENSO CORPORATION, Kariya (JP)

(72) Inventor: Mai Sakamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 368 days.

(21) Appl. No.: 17/388,978

(22) Filed: Jul. 29, 2021

(65) Prior Publication Data

US 2021/0354717 A1 Nov. 18, 2021

Related U.S. Application Data

(63) Continuation of application No. PCT/JP2020/003176, filed on Jan. 29, 2020.

(30) Foreign Application Priority Data

Feb. 1, 2019 (JP) .................. 2019-017329

(51) Int. Cl.
*B60W 50/14* (2020.01)
*B60W 30/09* (2012.01)
*B60W 40/09* (2012.01)

(52) U.S. Cl.
CPC ............ *B60W 50/14* (2013.01); *B60W 30/09* (2013.01); *B60W 40/09* (2013.01); *B60W 2050/143* (2013.01)

(58) Field of Classification Search
CPC ...... B60W 50/14; B60W 30/09; B60W 40/09; B60W 2050/143; B60W 2420/52; B60W 2520/06; G01S 13/931; G08G 1/16
See application file for complete search history.

(56) References Cited

U.S. PATENT DOCUMENTS

2014/0225722 A1* 8/2014 Takahashi ............. G08G 1/168
340/435
2014/0354450 A1 12/2014 Takahashi et al.

FOREIGN PATENT DOCUMENTS

JP 2013-045142 A 3/2013

* cited by examiner

*Primary Examiner* — Adam R Mott
*Assistant Examiner* — Erick T. Detweiler
(74) *Attorney, Agent, or Firm* — MASCHOFF BRENNAN

(57) ABSTRACT

In a warning apparatus, a restriction unit performs restriction of the issuance of a warning about a ghost from an issuing unit. A trajectory calculator calculates an estimated trajectory of each of first and second target objects. A cancelling unit cancels the restriction of the issuance of the warning about the ghost from the issuing unit upon determination that a predetermined cancelation condition is satisfied for the first and second target objects. The cancelation condition includes a condition that a passing distance between the first and second target objects is larger than a predetermined distance threshold.

6 Claims, 11 Drawing Sheets

WARNING APPARATUS

CROSS-REFERENCE TO RELATED APPLICATION

This application is a bypass continuation application of currently pending international application No. PCT/JP2020/003176 filed on Jan. 29, 2020 designating the United States of America, the entire disclosure of which is incorporated herein by reference.

This application is based on and claims the benefit of priority from Japanese Patent Application No. 2019-017329 filed on Feb. 1, 2019, the disclosure of which is incorporated in its entirety herein by reference.

TECHNICAL FIELD

The present disclosure relates to warning apparatuses.

BACKGROUND

A technology, which is called Rear Cross Traffic Alert (RCTA), installed in an own vehicle detects, using at least one radar mounted to the rear of the own vehicle, one or more other vehicles approaching the rearward direction of the own vehicle when the own vehicle is reversing, and informs a driver of the detected one or more other vehicles. Such a reversing vehicle will be referred to simply as an own vehicle, and vehicles approaching the rearward direction of the own vehicle will be referred to simply as other vehicles.

SUMMARY

A warning apparatus installed in an own vehicle according to an exemplary aspect of the present disclosure includes, a restriction unit, a trajectory calculator, and a cancelling unit.

The restriction unit is configured to
  (i) Determine whether a predetermined restriction condition is satisfied for first and second target objects
  (ii) Determine that, upon determination that the restriction condition is satisfied for the first and second target objects, one of the first and second target objects is a ghost, and the other of the first and second target objects except for the ghost is a warning target that is a warning candidate
  (iii) Perform restriction of the issuance of a warning about the ghost from an issuing unit The trajectory calculator is configured to calculate an estimated trajectory of each of the first and second target objects in a rearward region. The rearward region is previously established behind the own vehicle.

The cancelling unit is configured to cancel the restriction of the issuance of the warning about the ghost upon determination that a predetermined cancelation condition is satisfied for the first and second target objects. The cancelation condition includes a condition that a passing distance between the first and second target objects is larger than a predetermined distance threshold. The passing distance between the first and second target objects is defined as a minimum distance between the estimated trajectory of the first target object and the estimated trajectory of the second target object.

DETAILED DESCRIPTION OF EMBODIMENTS

Figure 1:
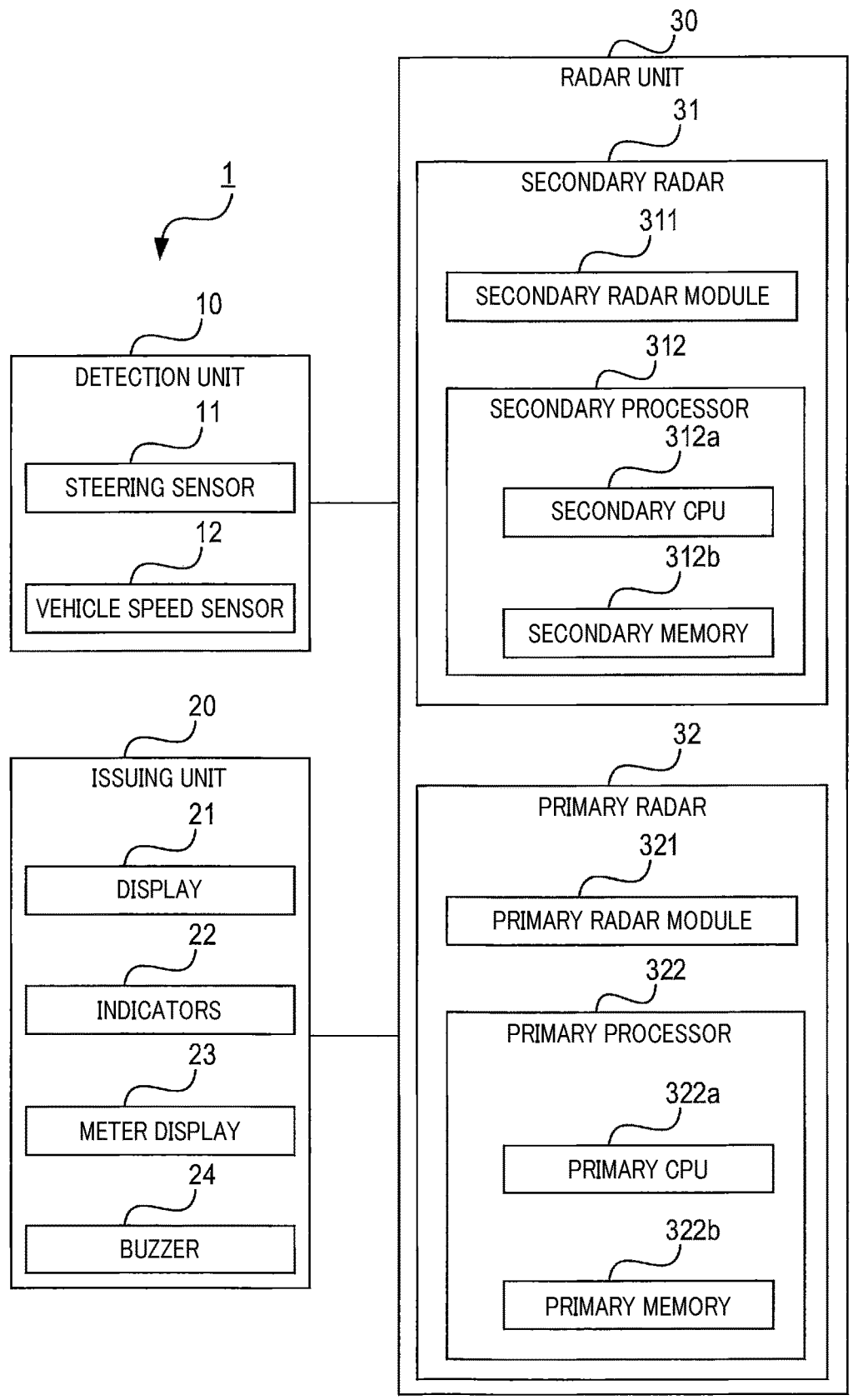
FIG. 1 is a block diagram illustrating the configuration of a warning system.

A technology, which is called RCTA, installed in an own vehicle detects, using at least one radar mounted to the rear of the own vehicle, one or more other vehicles approaching the rearward direction of the own vehicle when the own vehicle is reversing, and informs a driver of the detected one or more other vehicles. Such a reversing vehicle will be referred to simply as an own vehicle, and vehicles approaching the rearward direction of the own vehicle will be referred to simply as other vehicles.

Methods of detecting, by an own vehicle, targets, such as other vehicles, around the own vehicle using radar waves may result in multipath propagation occurring. Multipath propagation is due to reflection of radar waves by solid obstacles located around the own vehicle. Radar multipath echoes may cause non-existent other vehicles, i.e., ghosts, to appear, and the ghosts may be detected by the own vehicle. These ghosts may cause a reduction in the accuracy of detecting targets.

An internal patent publication No. 2013/038477 discloses a technology used in a situation where there are first and second other-vehicle candidates approaching an own vehicle. The technology disclosed in patent literature 1 determines that one of the first and second other-vehicle candidates is a ghost to thereby prevent the issuance of a warning for the one of the first and second other-vehicle candidates if the following restriction condition is satisfied:

The restriction condition is that
  (i) An absolute difference between a first relative distance of the first other-vehicle candidate relative to the own vehicle and a second relative distance of the second other-vehicle candidate relative to the own vehicle is smaller than a predetermined threshold distance
  (ii) An absolute difference between a first relative speed of the first other-vehicle candidate relative to the own vehicle and a second relative speed of the second other-vehicle candidate relative to the own vehicle is smaller than a predetermined threshold speed (iii) An absolute difference between a first estimated crossing time of the first other-vehicle candidate to the own vehicle and a second estimated crossing time of the second other-vehicle candidate to the own vehicle is smaller than a predetermined threshold time.

As a result of detailed consideration of a warning device disclosed in the patent publication, the inventors of the present disclosure have found an issue that the warning device disclosed in the patent publication may excessively prevent the issuance of a warning about an approaching other vehicle, resulting in a reduction in the accuracy of determining whether there is a target about which an issuance of a warning is required.

Specifically, if first and second other vehicles, which are actually located to approach the own vehicle, satisfy the restriction condition, the warning device disclosed in patent literature 1 may excessively prevent the issuance of a warning about one of the actual first and second other vehicles.

An aspect of the present disclosure preferably provides a technology usable by a warning apparatus for issuing a warning about an approaching vehicle, which improves the accuracy of determining whether there is a target about which an issuance of a warning is required.

A warning apparatus installed in an own vehicle according to one aspect of the present disclosure includes an obtaining unit, a warning determiner, an issuing unit, a restriction unit, a trajectory calculator, and a cancelling unit.

The obtaining unit is configured to obtain information about first and second target objects that are detected in respective right and left rear regions of the own vehicle by a radar module.

The warning deter miner is configured to determine, based on the information about the first and second target objects, whether each of the first and second target objects is a warning candidate about which an issuance of a warning is required.

The issuing unit is configured to perform an issuance of a warning about the warning candidate to a driver of the own vehicle when the own vehicle is reversing.

The restriction unit is configured to
(i) Determine whether a predetermined restriction condition is satisfied for the first and second target objects
(ii) Determine that, upon determination that the restriction condition is satisfied for the first and second target objects, one of the first and second target objects is a ghost, and the other of the first and second target objects except for the ghost is a warning target that is the warning candidate
(iii) Perform restriction of the issuance of the warning about the ghost from the issuing unit The trajectory calculator is configured to calculate an estimated trajectory of each of the first and second target objects in a rearward region. The rearward region is previously established behind the own vehicle.

The cancelling unit is configured to cancel the restriction of the issuance of the warning about the ghost upon determination that a predetermined cancelation condition is satisfied for the first and second target objects. The cancelation condition includes a condition that a passing distance between the first and second target objects is larger than a predetermined distance threshold. The passing distance between the first and second target objects is defined as a minimum distance between the estimated trajectory of the first target object and the estimated trajectory of the second target object.

Actually existing vehicles usually pass each other with a given distance therebetween. The above aspect of the present disclosure determines that vehicles traveling in a rearward region of an own vehicle are each likely to be not a ghost but an actually existing vehicle upon determination that the passing distance between the vehicles is larger than the distance threshold. That is, the above aspect of the present disclosure cancels the restriction of the issuance of the warning about one of the first and second target objects from the issuing unit as long as, even if the restriction condition is satisfied for the first and second target objects, the cancellation condition is satisfied for the first and second target objects. This therefore results in improvement in the accuracy of determining whether one of the first and second extracted vehicles is a warning target.

The following describes an exemplary embodiment of the present disclosure with reference to the accompanying drawings.

Configuration

Referring to FIG. 1, a warning system 1 includes a detection unit 10, an issuing unit 20, and a radar unit 30. The warning system 1 is installed in a vehicle 100, which will be referred to as an own vehicle 100.

Figure 2:
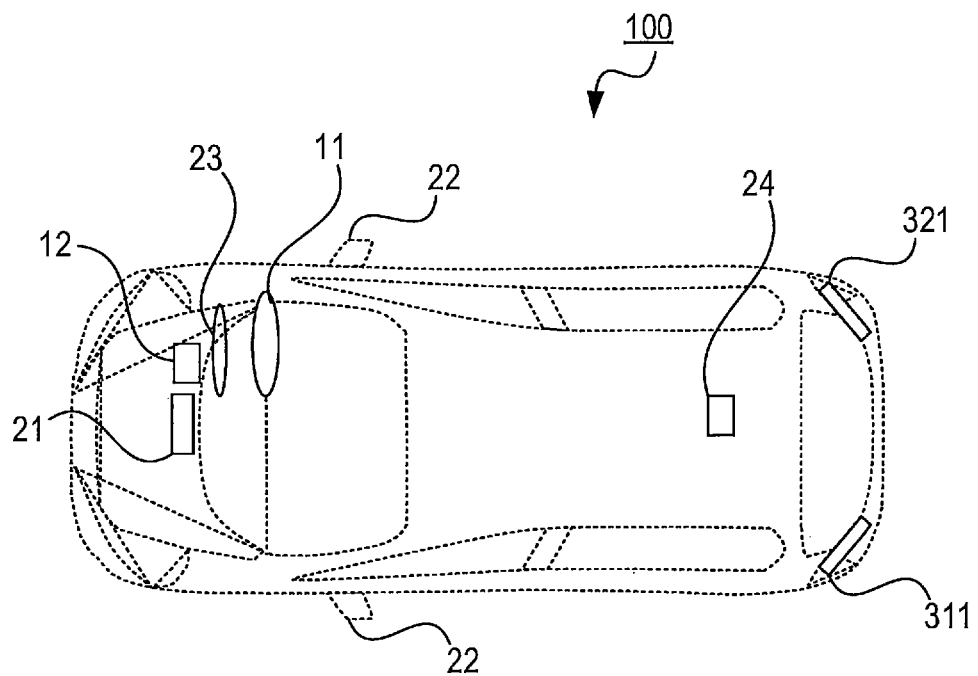
FIG. 2 is a view illustrating the arrangement of components constituting the warning system.

FIG. 2 illustrates an example of how various components of the warning system 1, which will be described hereinafter, are installed to the own vehicle 100. The installed positions of the components of the warning system 1 can be freely changed as long as each of the components fulfils one or more functions allocated thereto.

The detection unit 10 is configured to detect a traveling direction and a traveling speed of the own vehicle 100.

The detection unit 10 includes a steering sensor 11 and a vehicle speed sensor 12.

The steering sensor 11 is configured to detect a steering angle of a steering wheel of the own vehicle 100, and output the detected steering angle of the steering wheel of the own vehicle 100. The steering sensor 11 is for example mounted at a position in the own vehicle 100; the mounted position of the steering sensor 11 is located to be close to the steering wheel.

The vehicle speed sensor 12 is configured to detect a speed of the own vehicle 100, and output the detected speed of the own vehicle 100. The vehicle speed sensor 12 is for example mounted at a position in the own vehicle 100; the mounted position of the vehicle speed sensor 12 is located to be close to one of front wheels of the own vehicle 100, and detects the speed of the own vehicle 100 based on a rotating speed of the one of the front wheels.

The issuing unit 20 is configured to issue visible and audible notices to a driver of the own vehicle 100 under an issuance control task carried out by the radar unit 30.

The issuing unit 20 includes a display 21, indicators 22, a meter display 23, and a buzzer 24.

The display 21 is configured to display images. The display 21 is mounted at a position in the own vehicle 100; the mounted position of the display 21 is located to be close to a driver's seat of the own vehicle 100, and enables a driver of the own vehicle 100 to visibly recognize images displayed on the display 21.

The display 21 can be installed in the own vehicle 100 independently from a display of a vehicle navigation system installed in the own vehicle 100. The vehicle navigation system and the issuing unit 20 can share the display 21.

Each of the indicators 22 is comprised of a lamp mounted to an edge of a corresponding one of right-side and left-side mirrors of the own vehicle 100. Each of the indicators 22 is configured to turn on the lamp or blink on and off the lamp to thereby issue notices.

The meter display 23 is installed in an instrument panel of the own vehicle 100, and configured to issue visible notices. For example, the meter display 23 can display predetermined icons as an issuance of visible notices.

The buzzer 24 is configured to issue sounds. The buzzer 24 is for example mounted at a position in the own vehicle 100; the mounted position of the buzzer 24 is located to be close to a backseat of the own vehicle 100.

The radar unit 30 is configured to
(1) Output radar waves
(2) Receive echoes resulting from reflection of the radar waves by one or more target objects located around the own vehicle 100
(3) Detect, based on the received echoes, the one or more target objects located around the own vehicle 100

The radar unit 30 includes a secondary radar 31 and a primary radar 32.

The secondary radar 31 includes a secondary radar module 311 and a secondary processor 312.

The secondary radar module 311 is mounted at a rear left portion of the own vehicle 100. The secondary radar module 311 is configured to (i) output radar waves to a left irradiation region R311, (ii) receive echoes resulting from reflection of the radar waves by target objects located within the left irradiation region R311, and (iii) detect, based on the received echoes, the target objects located within the left irradiation region R311.

Figure 3:
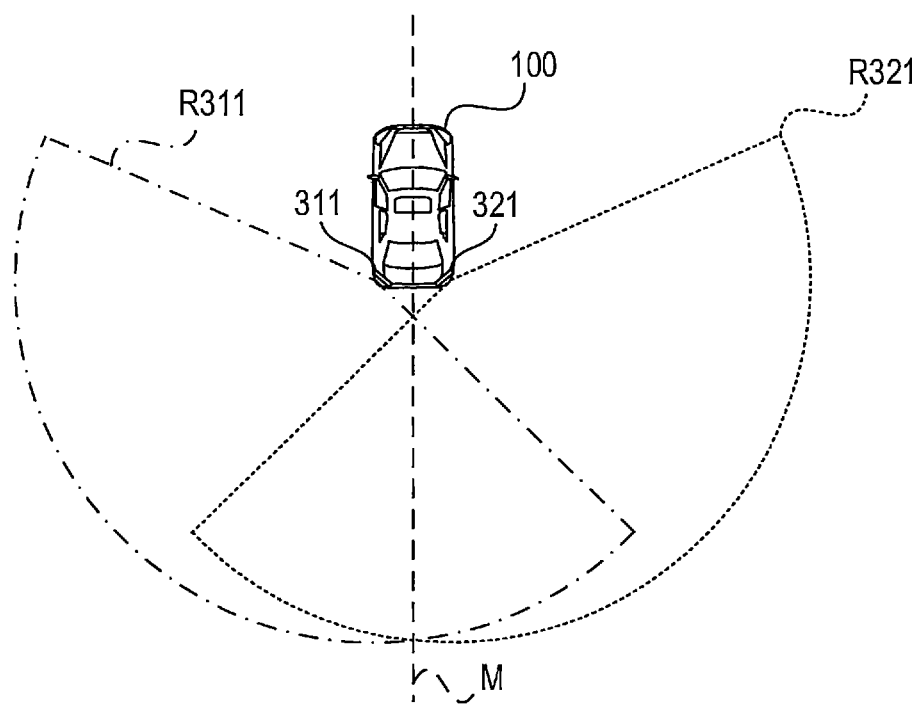
FIG. 3 is a view illustrating a left irradiation region and a right irradiation region.

The left irradiation region R311 is, for example as illustrated in FIG. 3, a predetermined shaped range defined to extend from a predetermined left front position with reference to the own vehicle 100 to a predetermined right rearward position with reference to the own vehicle 100. The secondary radar module 311 is additionally configured to measure (i) a position of each target object relative to the own vehicle 100, (ii) a traveling direction of each target object, and (iii) a speed of each target object.

The secondary processor 312 is comprised of a microcomputer that includes a secondary CPU 312a and a secondary memory 312b. The secondary processor 312 is configured to perform a secondary warning routine described later. For example, a semiconductor memory, such as a RAM and/or a ROM can be used as the secondary memory 312b.

The primary radar 32 has a configuration that is basically identical to the above configuration of the secondary radar 31.

The primary radar 32 includes a primary radar module 321 and a primary processor 322.

The primary radar module 321 is mounted at a rear right portion of the own vehicle 100 as compared with the secondary radar module 311 being mounted at the rear left portion of the own vehicle 100.

As compared with the secondary radar module 311 being configured to output radar waves to the left irradiation region R311, the primary radar module 321 is configured to output radar waves to a predetermined right irradiation region R321 (see FIG. 3).

The right irradiation region R321 is a predetermined shaped range defined to extend from a predetermined right front position with reference to the own vehicle 100 to a predetermined left rearward position with reference to the own vehicle 100.

In particular, the secondary radar module 311 and the primary radar module 321 are mounted to the own vehicle 100 such that the left irradiation region R311 and the right irradiation region R321 are bilaterally symmetric with each other about a center line M of the own vehicle 100. The center line M of the own vehicle 100 is a virtual line that passes through a center point of the own vehicle 100 in its width direction, and extends in a longitudinal direction of the own vehicle 100.

The primary processor 322 includes a primary CPU 322a and a primary memory 322b.

As compared with the secondary processor 312 being configured to perform the secondary warning routine, the primary processor 322 is configured to perform a primary warning routine described later. The secondary warning routine is configured to obtain information about one or more target objects detected by the secondary radar 31 and the primary radar 32, and the primary warning routine is similarly configured to obtain information about one or more target objects detected by the secondary radar 31 and the primary radar 32.

In particular, the secondary warning routine is configured to output the information about the one or more detected target objects to the primary radar 32. In contrast, the primary warning routine is configured to perform the issuance control task for the issuing unit 20.

All the components constituting the warning system 1 can be communicably connected to each other via a transmission lines that constitute, for example, a Controller Area network (CAN®). That is, the components of the warning system 1 can perform communications with each other using predetermined CAN protocols.

The radar unit 30 serves as a warning apparatus.

Operations

Secondary Warning Routine

Figure 4:
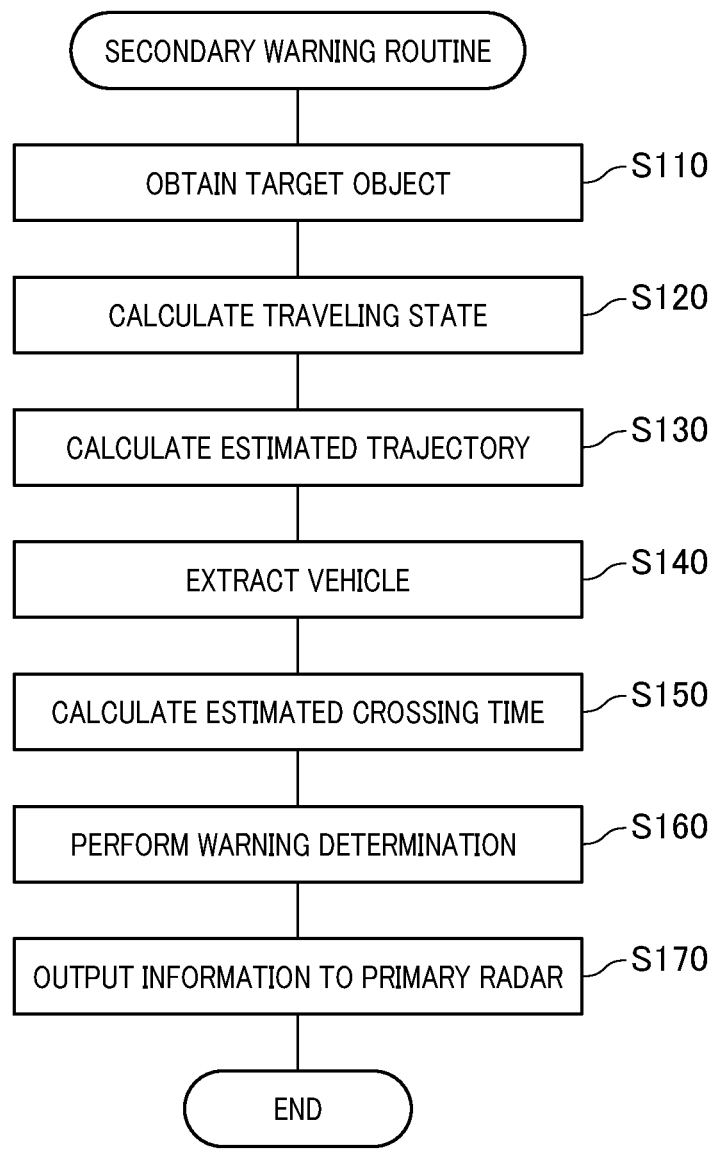
FIG. 4 is a flowchart illustrating a secondary warning routine, i.e., a slave warning routine.

Next, the following describes the secondary warning routine carried out by the secondary CPU 312a with reference to the flowchart of FIG. 4. The secondary CPU 312a is programmed to repeatedly execute the secondary warning routine each time the own vehicle 100 is reversing. In other words, the secondary CPU 312a is programmed to repeatedly perform the secondary warning routine while a selectable position of a shift lever installed in the own vehicle 100 is set to a reverse range (R); the reverse range is selected by the shift lever when the own vehicle 100 is intended to be reversing.

In step S110, the secondary CPU 312a obtains, from the secondary radar module 311, information about each target object located in the left irradiation region R311 detected by the secondary radar module 311.

The information about each target object detected by the secondary radar module 311 includes the position, traveling direction, and speed of each target object relative to the own vehicle 100. The target objects detected by the secondary radar module 311 may include at least one actually existing target object and at least one ghost generated due to multipath propagation.

In step S120, the secondary CPU 312a calculates a traveling state of the own vehicle 100 in accordance with (i) the steering angle of the steering wheel outputted from the steering sensor 11 and (ii) the speed of the own vehicle 100 outputted from the vehicle speed sensor 12; the traveling state of the own vehicle 100 represents the traveling direction and the speed of the own vehicle 100.

In step S130, the secondary CPU 312a calculates an estimated trajectory of each target object obtained in step S110. For example, the secondary CPU 312a calculates the estimated trajectory of each target object in accordance with (1) The speed of the corresponding target object relative to the own vehicle 100 obtained in step S110
(2) The traveling direction of the corresponding target object obtained in step S110
(3) The speed and traveling direction of the own vehicle 100 obtained in step S120

Specifically, the secondary CPU 312a obtains a target-object vector of each target object; the target-object vector of each target object represents the relative speed of the corresponding target object relative to the own vehicle 100 and the traveling direction of the corresponding target object. The secondary CPU 312a also obtains an own-vehicle vector of the own vehicle 100, which represents the speed and traveling direction of the own vehicle 100. Then, the secondary CPU 312a subtracts the own-vehicle vector of the own vehicle 100 from the target-object vector of each target object to thereby calculate an estimated trajectory of the corresponding target object. A vector representing the estimated trajectory of each target object will also be referred to as a trajectory vector of the corresponding target vehicle.

Next, in step S140, the secondary CPU 312a extracts, from the target objects obtained in step S110, at least one target object located around the own vehicle 100. The extracted at least one target object will also be referred to as at least one extracted vehicle.

The secondary CPU 312a can extract, from the target objects, at least one target object that has a magnitude of the trajectory vector thereof is larger than a predetermined travel threshold. For example, the magnitude of the travel threshold can be set to 0, so that the secondary CPU 312a can extract, from the target objects, at least one target object whose trajectory vector is not a zero vector. The magnitude of the travel threshold is not limited to 0, and can be set to a predetermined value determined based on errors in measurement of the trajectory vector of each target object.

In step S150, the secondary CPU 312a calculates an estimated crossing time of the at least one extracted vehicle estimated in step S140.

The estimated crossing time of the at least one extracted vehicle represents a time required for the at least one extracted vehicle to reach a rearward region Ar previously established at a rearward region of the own vehicle 100.

Figure 5:
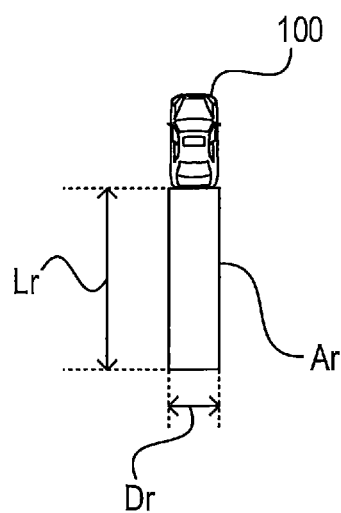
FIG. 5 is a view illustrating a rearward region.

Additionally, the rearward region Ar for the own vehicle 100 is defined as a range constituted by extending a lateral width Dr corresponding to the width of the own vehicle 100 from the rear end of the own vehicle 100 by a predetermined length Lr (see FIG. 5). The predetermined length Lr can be determined beforehand at the time of manufacturing the secondary radar 31. The predetermined length Lr can be previously determined as a value that corresponds to a width of a traffic lane in geographical regions where vehicles, in each of which the warning system 1 including the secondary radar 31 is installed, are usable.

How to obtain the estimated crossing time of the at least one extracted vehicle is as follows. Specifically, a distance required for the estimated trajectory of the at least one estimation vehicle to reach the rearward region Ar of the own vehicle 100 from the position of the at least one extracted vehicle will be referred to as a crossing distance. Then, dividing the crossing distance by the speed of the at least one extracted vehicle obtains the estimated crossing time of the at least one extracted vehicle.

If plural extracted vehicles are obtained in step S140, the secondary CPU 312a, in step S160, sets a warning flag for at least one selected extracted vehicle from the plural extracted vehicles upon determination that the estimated crossing time of the at least one selected extracted vehicle is lower than or equal to a predetermined warning threshold time.

That is, the secondary CPU 312a sets the warning flag for at least one selected extracted vehicle when predicting that the reversing of the own vehicle 100 will collide with the at least one selected extracted vehicle. For example, the warning threshold time is set to 3.5 seconds. The secondary CPU 312a can reset the warning flag each time the secondary CPU 312a starts to perform the secondary warning routine. The secondary CPU 312a can be configured to reset the warning flag each time the secondary CPU 312a performs the secondary warning routine a predetermined number of times.

The at least one selected extracted vehicle for which the warning flag is set corresponds to at least one warning candidate.

In step S170, the secondary CPU 312a outputs, to the primary radar 32, information about the at least one extracted vehicle obtained in step S140; the information about the at least one extracted vehicle includes information about the warning flag set for at least one warning candidate. Thereafter, the secondary CPU 312a terminates the secondary warning routine.

The secondary CPU 312a serves as an obtaining unit to perform the operation in step S110, serves as a trajectory calculator to perform the operation in step S130, and serves as an estimator to perform the operation in step S150.

Primary Warning Routine

Figure 6:
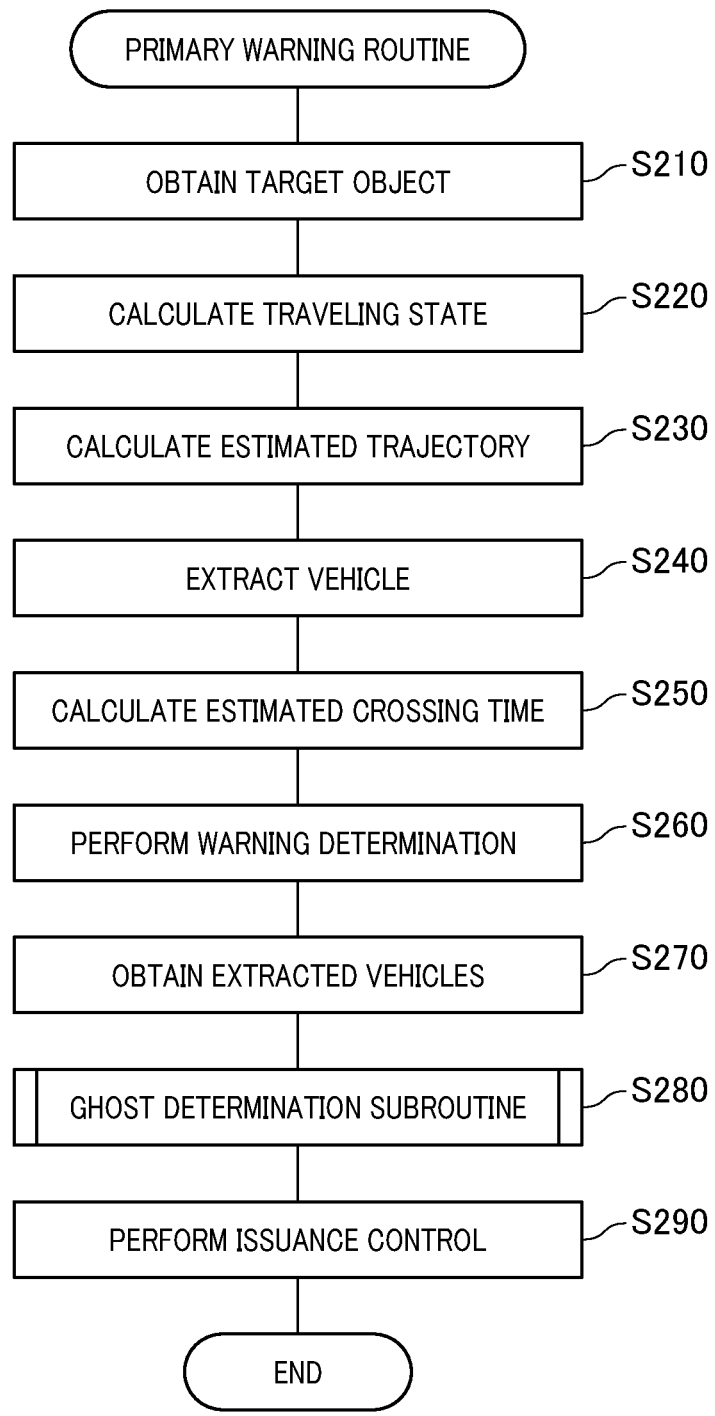
FIG. 6 is a flowchart illustrating a primary warning routine, i.e., a master warning routine.

Next, the following describes the primary warning routine carried out by the primary CPU 322a with reference to the flowchart of FIG. 6. The primary CPU 322a is programmed to repeatedly execute the primary warning routine while the selectable position of the shift lever installed in the own vehicle 100 is set to the reverse range (R).

Operations in steps S210 to S260 of the primary warning routine are fundamentally identical to the respective operations in steps S110 to S160 of the secondary warning routine. Specifically, the secondary radar module 311, the secondary CPU 312a, the secondary memory 312b, and the left irradiation region R311 in the secondary warning routine respectively correspond to the primary radar module 321, the primary CPU 322a, the primary memory 322b, and the right radar module R321.

In step S270, the primary CPU 322a obtains, from the secondary CPU 312a, the information about the at least one extracted vehicle obtained in step S140 of the secondary warning routine as secondary target-object information, and obtains the information about the at least one extracted vehicle obtained in step S240 of the primary warning routine as primary target-object information.

In step S280, the primary CPU 322a performs a ghost determination subroutine. The ghost determination subroutine is programmed to set a ghost flag for at least one extracted vehicle selected from the extracted vehicles obtained in step S270 upon determination that the selected at least one extracted vehicle is a ghost. The ghost determination routine will be described in detail later.

In step S290, the primary CPU 322a performs the issuance control task that outputs, as at least one warning target, at least one extracted vehicle to which (1) The warning flag has been set in step S160 or S260
(2) No ghost flag has been set in step S280

The issuance control task is programmed to cause the issuing unit 20 to issue notices to the driver of the own vehicle 100 using at least one of the display 21, indicators 22, meter display 23, and buzzer 24 included in the issuing unit 20.

How the primary CPU 322a issues notices using the issuing unit 20 can be changed depending on whether the at least one warning target is detected in the left irradiation region R311 or the right irradiation region R321.

Specifically, when detecting at least one warning target in the left irradiation region R311, the primary CPU 322a can instruct the indicator 22 mounted to the left-side mirror to turn on or blink on. Similarly, when detecting at least one warning target in the right irradiation region R321, the primary CPU 322a can instruct the indicator 22 mounted to the right-side mirror to turn on or blink on.

The primary CPU 322a can instruct the display 21 or meter display 23 to display the direction of at least one warning target from the own vehicle 100.

The primary CPU 322a serves as an obtaining unit to perform the operation in step S210, serves as a trajectory calculator to perform the operation in step S230, serves as an estimator to perform the operation in step S250, and serves as an issuing unit to perform the operation in step S290.

Ghost Determination Routine

Figure 7:
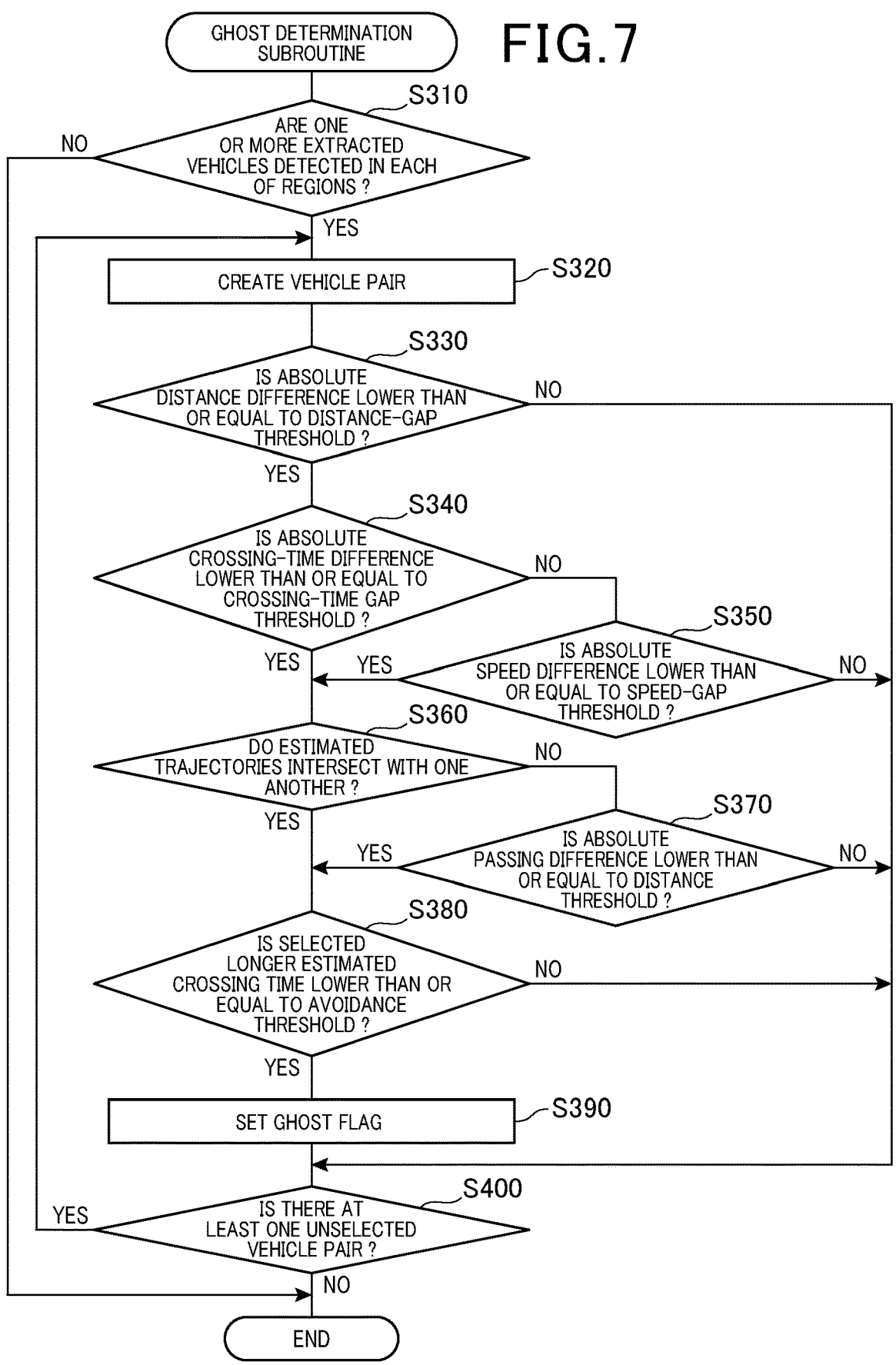
FIG. 7 is a flowchart illustrating a ghost determination subroutine.

Next, the following describes the ghost determination routine performed in step S280 of the primary warning routine with reference to the flowchart of FIG. 7.

In step S310, the primary CPU 322a determines, based on the secondary target-object information and primary target-object information, whether one or more extracted vehicles are detected in each of the left irradiation region R311 and the right irradiation region R321.

Figure 12:
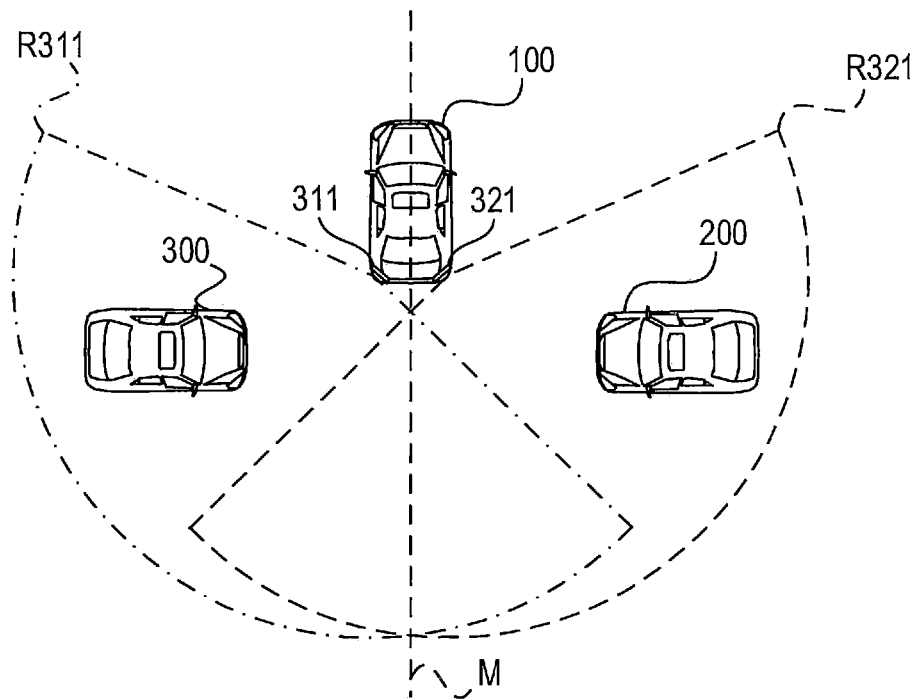
FIG. 12 is a view illustrating an example of extracted vehicles detected in the respective left and right irradiation regions.
Figure 13:
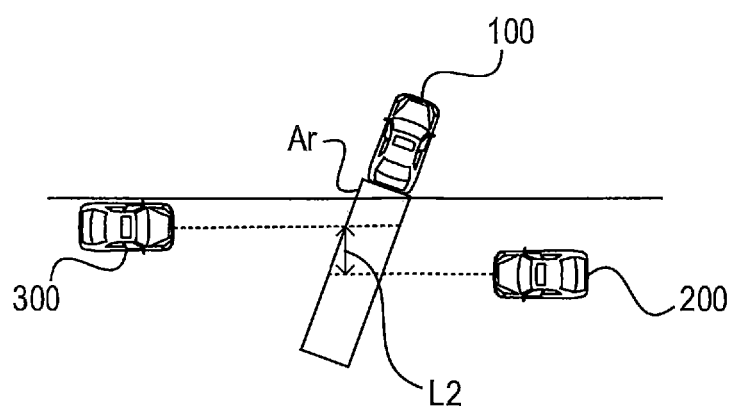
FIG. 13 is a view illustrating a passing distance between vehicles.

For example, as illustrated in FIG. 12, if an extracted vehicle 300 is detected in the left irradiation region R311 and an extracted vehicle 200 is detected in the right irradiation region R321, the primary CPU 322a determines that one or more extracted vehicles are detected in each of the left irradiation region R311 and the right irradiation region R321.

The determination in step S310 is based on the fact that, if a ghost is detected in one of the left irradiation region R311 and the right irradiation region R321, an actual target object corresponding to the ghost exists in the other of the left irradiation region R311 and the right irradiation region R321. Upon determination that no extracted vehicles are detected in each of the left irradiation region R311 and the right irradiation region R321, the primary CPU 322a determines that no ghosts are detected in the irradiation regions R311 and R321.

That is, the primary CPU 322a terminates the ghost determination subroutine upon determination that no extracted vehicles are detected in each of the left irradiation region R311 and the right irradiation region R321.

In contrast, the ghost determination subroutine proceeds to step S320 upon determination that one or more extracted vehicles are detected in each of the left irradiation region R311 and the right irradiation region R321.

In step S320, the primary CPU 322a selects one extracted vehicle from the one or more extracted vehicles detected in the left irradiation region R311 and included in the extracted vehicles obtained in step S270. In step S320, the primary CPU 322a also selects one extracted vehicle from the one or more extracted vehicles detected in the right irradiation region R321 and included in the extracted vehicles obtained in step S270.

Then, in step S320, the primary CPU 322a combines the selected extracted vehicle, i.e., a first extracted vehicle, in the left irradiation region R311 and the selected extracted vehicle, i.e., a second extracted vehicle, in the right irradiation region R321 with one another to thereby create a vehicle pair of the first and second extracted vehicles.

When returning to step S320 upon determination that there is at least one unselected vehicle pair in the extracted vehicles obtained in step S270, the primary CPU 322a selects two extracted vehicles of the remaining extracted vehicles except for one or more already selected extracted vehicles and for one or more ghost-based extracted vehicles to each of which the ghost flag has been set, and sets a new vehicle pair based on the selected two extracted vehicles.

The following operations from step S330 to step S380 serve as a ghost determination task for determining whether one of the vehicle pair comprised of two extracted vehicles is a ghost. In particular, the operations in step S330 to S350 determine whether a predetermined restriction condition is satisfied, and the operations in steps S360 to S380 determine whether a predetermined cancellation condition is satisfied.

In step S330, the primary CPU 322a calculates a first distance of the first extracted vehicle of the vehicle pair from the own vehicle 100, and calculates a second distance of the second extracted vehicle of the vehicle pair from the own vehicle 100. Then, in step S330, the primary CPU 322a calculates an absolute distance difference between the first distance and the second distance, and determines whether the calculated absolute distance difference is lower than or equal to a predetermined distance-gap threshold, such as 10 meters.

Upon determination that the calculated absolute distance deference is larger than the predetermined distance-gap threshold (NO in step S330), the ghost determination subroutine proceeds to step S400, so that the primary CPU 322a performs the operation in step S400.

Specifically, the primary CPU 322a determines, in step S400, whether there is at least one unselected vehicle pair in the extracted vehicles obtained in step S270. At least one unselected vehicle pair is a combination of two extracted vehicles unselected as a vehicle pair in step S320.

Upon determination that there is at least one unselected vehicle pair in the extracted vehicles obtained in step S270 (YES in step S400), the ghost determination subroutine proceeds to step S320, and the primary CPU 322a performs the sequence of the operations from the operation in step S320.

Otherwise, upon determination that there are no unselected vehicle pairs in the extracted vehicles obtained in step S270 (NO in step S400), the primary CPU 322a terminates the ghost determination subroutine.

Otherwise, upon determination that the calculated absolute distance difference is lower than or equal to the predetermined distance-gap threshold (YES in step S330), the ghost determination subroutine proceeds to step S340.

In step S340, the primary CPU 322a calculates an absolute crossing-time difference between the estimated crossing time of the first extracted vehicle of the vehicle pair and the estimated crossing time of the second extracted vehicle of the vehicle pair, and determines whether the calculated absolute crossing-time difference is lower than or equal to a predetermined crossing-time gap threshold, such as 1 second.

Upon determination that the calculated absolute crossing-time difference is lower than or equal to the predetermined crossing-time gap threshold (YES in step S340), the ghost determination subroutine proceeds to step S360.

Otherwise, upon determination that the calculated absolute crossing-time difference is larger than the predetermined crossing-time gap threshold (NO in step S340), the ghost determination subroutine proceeds to step S350.

In step S350, the primary CPU 322a calculates an absolute speed difference between the speed of the first extracted vehicle of the vehicle pair and the speed of the second extracted vehicle of the vehicle pair, and determines whether the calculated absolute speed difference is lower than or equal to a predetermined speed-gap threshold.

The speed of the first extracted vehicle in the vehicle pair is a speed obtained by subtracting, from the relative speed of the first extracted vehicle in the vehicle pair relative to the own vehicle 100, a speed component due to the traveling of the own vehicle 100. Similarly, the speed of the second extracted vehicle in the vehicle pair is a speed obtained by subtracting, from the relative speed of the second extracted vehicle in the vehicle pair relative to the own vehicle 100, the speed component due to the traveling of the own vehicle 100. The predetermined speed-gap threshold is set to, for example, 1 meter per second.

Upon determination that the calculated absolute speed difference is larger than the predetermined speed-gap threshold (NO in step S350), the ghost determination subroutine proceeds to step S400, so that the primary CPU 322a performs the operation in step S400.

Otherwise, upon determination that the calculated absolute speed difference is lower than or equal to the predetermined speed-gap threshold (YES in step S350), the ghost determination subroutine proceeds to step S360.

In step S360, the primary CPU 322a determines whether the estimated trajectory of the first extracted vehicle of the vehicle pair intersects with the estimated trajectory of the second extracted vehicle of the vehicle pair in accordance with an angle between the estimated trajectory of the first extracted vehicle and the estimated trajectory of the second extracted vehicle.

Figure 8:
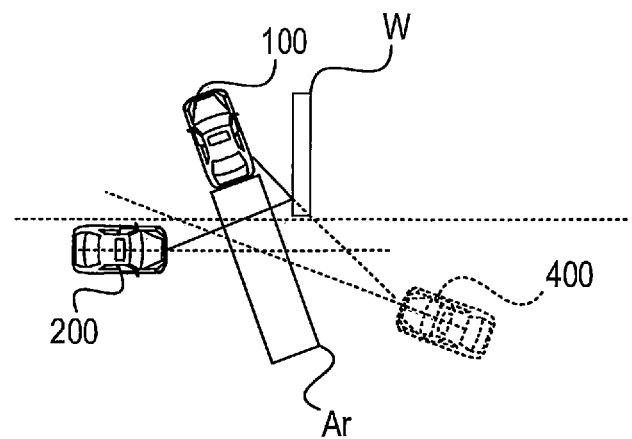
FIG. 8 is a view illustrating an example of a generated ghost.

Specifically, as illustrated in FIG. 8, let us assume a first situation where the own vehicle 100 is traveling on a road in an oblique direction relative to the longitudinal direction of the road. In the first situation, the occurrence of a ghost as a ghost extracted vehicle 400 from an existing extracted vehicle 200 may result in the estimated trajectory of the existing extracted vehicle 200 and the estimated trajectory of the ghost extracted vehicle 400 intersecting with each other. For this reason, the primary CPU 322a uses information indicative of whether the estimated trajectories of the first and second extracted vehicles of the vehicle pair intersect with each other as a condition for determining whether there is a ghost in the vehicle pair.

Figure 9:
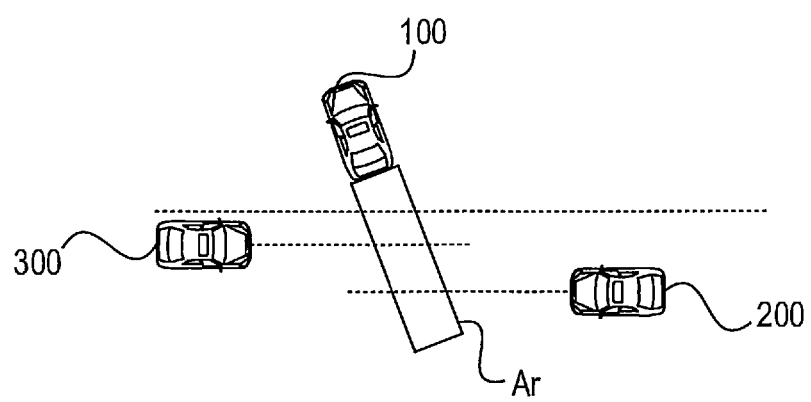
FIG. 9 is a view illustrating an example where actually existing vehicles pass each other.

Additionally, let us assume a second situation where actually existing vehicles, such as actually existing extracted vehicles 200 and 300, pass each other behind the own vehicle 100. In the second situation, because a driver of each of the actually existing extracted vehicles 200 and 300 is estimated to drive the corresponding one of the actually existing extracted vehicles 200 and 300 to thereby avoid the corresponding one of the actually existing extracted vehicles 200 and 300 from colliding with the other of the actually existing extracted vehicles 200 and 300, the estimated trajectories of the actually existing extracted vehicles 200 and 300 do not intersect with one another (see FIG. 9).

Upon determination that the estimated trajectory of the first extracted vehicle of the vehicle pair intersects with the estimated trajectory of the second extracted vehicle of the vehicle pair (YES in step S360), the ghost determination subroutine proceeds to step S380.

Otherwise, upon determination that the estimated trajectory of the first extracted vehicle of the vehicle pair does not intersect with the estimated trajectory of the second extracted vehicle of the vehicle pair (NO in step S360), the ghost determination subroutine proceeds to step S370.

In step S370, the primary CPU 322a calculates a passing distance between the first and second extracted vehicles of the vehicle pair, and determines whether the calculated absolute passing difference is lower than or equal to a predetermined distance threshold.

The passing distance between the first and second extracted vehicles of the vehicle pair is defined as a length of a vertical line that extends from (i) a point on the edge of the rearward region Ar through which the first extracted vehicle of the vehicle pair passes to (ii) the estimated trajectory of the second extracted vehicle of the vehicle pair. That is, the passing distance between the first and second extracted vehicles of the vehicle pair represents a minimum distance between the estimated trajectory of the first extracted vehicle of the vehicle pair and the estimated trajectory of the second extracted vehicle of the vehicle pair.

The predetermined distance threshold is set to a value selected from the distance range that enables the first and second extracted vehicles in the vehicle pair to pass each other. For example, the predetermined distance threshold is set to the width of a standard vehicle, such as of the order of 2 meters.

Figure 10:
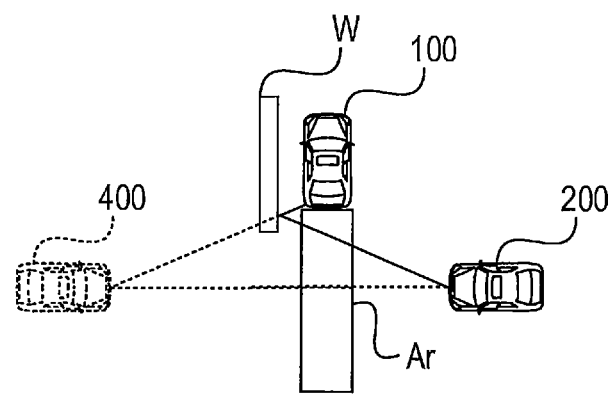
FIG. 10 is a view illustrating another example of a generated ghost.

FIG. 10 illustrates a third situation where reflection of radar waves by an obstacle existing around the own vehicle 100 results in multipath propagation being generated, and the multipath propagation cause a ghost, i.e., a ghost extracted vehicle 400, to be detected by the own vehicle 100.

If the traveling direction of the own vehicle 100 on a road is oriented outwardly from the road to be perpendicular to the longitudinal direction of the road (see FIG. 10), the occurrence of a ghost as a ghost extracted vehicle 400 from an existing extracted vehicle 200 may result in the estimated trajectory of the existing extracted vehicle 200 and the estimated trajectory of the ghost extracted vehicle 400 being parallel to each other, so that the estimated trajectory of the existing extracted vehicle 200 and the estimated trajectory of the ghost extracted vehicle 400 do not intersect with each other. In the third situation illustrated in FIG. 10, the passing distance between the extracted vehicle 200 and the extracted vehicle 400 may be lower than the predetermined distance threshold of, for example, the width of a standard vehicle.

Figure 11:
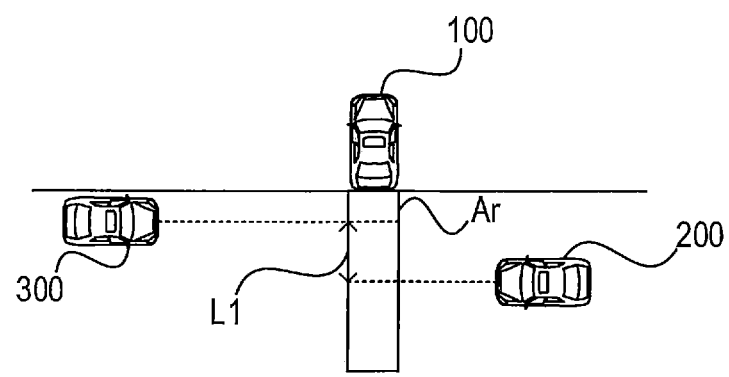
FIG. 11 is a view illustrating another example where actually existing vehicles pass each other.

On the other hand, FIG. 11 illustrates a fourth situation where actually existing vehicles, such as actually existing extracted vehicles 200 and 300, are detected, which pass each other to the rear of the own vehicle 100. In the fourth situation, the passing distance L 1 between the extracted vehicles 200 and 300 in the rearward region Ar becomes larger than or equal to the predetermined distance threshold. For this reason, the primary CPU 322a makes it possible to determine that the extracted vehicles 200 and 300 in the fourth situation are actually existing vehicles.

Upon determination that the passing distance is larger than the predetermined distance threshold (NO in step S370), the ghost determination subroutine proceeds to step S400, so that the primary CPU 322a performs the operation in step S400.

Otherwise, upon determination that the passing distance is lower than or equal to the predetermined distance threshold (YES in step S370), the ghost determination subroutine proceeds to step S380.

In step S380, the primary CPU 322a selects, as a longer estimated crossing time, one of the estimated crossing time of the first extracted vehicle of the vehicle pair and the estimated crossing time of the second extracted vehicle of the vehicle pair. Then, in step S380, the primary CPU 322a determines whether the selected longer estimated crossing time is lower than or equal to a predetermined avoidance threshold.

That is, even if the estimated trajectories of the first and second extracted vehicles of the vehicle pair intersect with each other, or the passing distance between the first and second extracted vehicles of the vehicle pair is lower than or equal to the predetermined avoidance threshold, the primary CPU 322a determines whether there is a possibility that the first and second extracted vehicles of the vehicle pair avoid collision with each other before reaching the rearward region Ar of the own vehicle 100. The avoidance threshold is for example set to a value, such as 5 seconds, larger than or equal to the warning threshold time.

Upon determination that the selected longer estimated crossing time is larger than the predetermined avoidance threshold (NO in step S380), the ghost determination subroutine proceeds to step S400. That is, if one of the estimated crossing time of the first extracted vehicle of the vehicle pair and the estimated crossing time of the second extracted vehicle of the vehicle pair is longer than the avoidance threshold, so that there is a possibility that the first and second extracted vehicles avoid collision with each other, the negative determination in step S380 maintains, as at least one warning target, each of the first and second extracted vehicles without being excluded from at least one warning target.

Otherwise, upon determination that the selected longer estimated crossing time is lower than or equal to the predetermined avoidance threshold (YES in step S380), the ghost determination subroutine proceeds to step S390.

In step S390, the primary CPU 322a determines that one of the first and second extracted vehicles, which has a greater distance from the own vehicle 100 than a distance of the other thereof from the own vehicle 100, is a ghost. Then, in step S390, the primary CPU 322a sets a ghost flag for the one of the first and second extracted vehicles, and thereafter, the ghost determination subroutine proceeds to step S400.

Specifically, as illustrated in FIG. 10, if echoes from the actually existing extracted vehicle 200 on the right side of the own vehicle 100 are reflected by an obstacle W located on the other left side of the own vehicle 100 and thereafter enter the own vehicle 100, the echoes, which are estimated as echoes from a ghost extracted vehicle 400 generated based on the actually existing extracted vehicle 200, have a longer propagation path than that of echoes that directly enter the own vehicle 100 without being reflected by obstacles. This results in the ghost extracted vehicle 400 being detected to be farther from the own vehicle 100 than the actually existing extracted vehicle 200.

For this reason, the primary CPU 322a determines that one of the first and second extracted vehicles, which has a greater distance from the own vehicle 100 than the distance of the other thereof from the own vehicle 100, is a ghost. Then, the primary CPU 322a sets the ghost flag for the one of the first and second extracted vehicles.

The ghost flag set for a ghost can be reset each time the actual number of times the primary warning routine is carried out reaches a predetermined threshold number of times. That is, the ghost flag set for an extracted vehicle can be held until the actual number of times the primary warning routine is carried out reaches the predetermined threshold number of times. Thereafter, a ghost flag can be set for an extracted vehicle in the primary warning routine again if the extracted vehicle is detected at the previously detected extracted vehicle determined as the ghost.

The operations in steps S330, S340, and S350 corresponds to a task carried out by a restriction unit, and the operations from step S360 to S380 correspond to, for example, a task carried out by a cancelling unit.

Benefits

The exemplary embodiment described in detail set forth above obtains the following benefits.

The exemplary embodiment is configured to determine that the predetermined restriction condition for extracted vehicles of a vehicle pair is satisfied upon determination that
(1) The distance of one of the extracted vehicles is substantially identical to the distance of the other of the extracted vehicles
(2) The estimated crossing-time of one of the extracted vehicles is substantially identical to the estimated crossing-time of the other of the extracted vehicles
(3) The speed of one of the extracted vehicles is substantially identical to the speed of the other of the extracted vehicles The exemplary embodiment is configured to determine that one of the extracted vehicles is a ghost upon determination that
(1) The predetermined restriction condition for the extracted vehicles is satisfied
(2) The predetermined cancellation condition for the extracted vehicles is unsatisfied The exemplary embodiment is configured to restrict issuance of a warning for the one of the extracted vehicles, which is determined to be a ghost, as a warning target.

In other words, the exemplary embodiment is configured to determine that each of the extracted vehicles is not a ghost but an actually existing vehicle upon determination that, even if the predetermined restriction condition for the extracted vehicles is satisfied, the predetermined cancellation condition for the extracted vehicles is satisfied.

The exemplary embodiment is configured to cancel restriction of issuance of a warning for each of the extracted vehicles, which is determined to be not a ghost, as a warning target.

The cancellation condition includes a condition that the passing distance between extracted vehicles of a vehicle pair is larger than the predetermined distance threshold; the passing distance between the extracted vehicles of the vehicle pair represents the minimum distance between the estimated trajectory of one of the extracted vehicle of the vehicle pair and the estimated trajectory of the other of the extracted vehicles of the vehicle pair.

The above configuration of the exemplary embodiment results in an improvement in the accuracy of determining whether one of extracted vehicles is a ghost.

The distance threshold of the exemplary embodiment is set to a standard width corresponding to the width of a standard vehicle. Actually existing extracted vehicles are likely to have a value of the passing distance that is larger than or equal to the standard width. Using the standard width as the distance threshold enables an improvement in the accuracy of determining whether each of extracted vehicles of a vehicle pair is an actually existing vehicle.

The exemplary embodiment is configured to determine whether which of extracted vehicles of a vehicle pair is a ghost in accordance with the distance of each of the extracted vehicles from the own vehicle 100. That is, the exemplary embodiment is configured to determine that a selected one of extracted vehicles of a vehicle pair is a ghost upon determination that the selected one of the extracted vehicles has a greater distance from the own vehicle 100 than that of the other of the extracted vehicles, because a ghost generated based on an actually existing vehicle has a greater distance than that of the actually existing vehicle.

Additionally, the exemplary embodiment is configured to determine that each of extracted vehicles of a vehicle pair is not a ghost upon determination that an estimated crossing time of each of the extracted vehicles is larger than the predetermined avoidance threshold even if (i) the estimated trajectory of one of the extracted vehicles of the vehicle pair intersect with the estimated trajectory of the other of the extracted vehicles of the vehicle pair and/or (ii) the passing distance between the extracted vehicles of the vehicle pair is lower than or equal to the distance threshold.

Even if (i) the estimated trajectory of one of the extracted vehicles of the vehicle pair intersect with the estimated trajectory of the other of the extracted vehicles of the vehicle pair and/or (ii) the passing distance between the extracted vehicles of the vehicle pair is lower than or equal to the distance threshold, the exemplary embodiment is configured not to determine that one of the extracted vehicles is excluded from a warning target as long as there is a possibility that the extracted vehicles avoid collision with each other before reaching the rearward region Ar of the own vehicle 100.

This configuration of the exemplary embodiment makes it possible to reduce a possibility that, although an actually existing vehicles travel to avoid collision with each other before reaching the rearward region Ar of the own vehicle 100, one of the actually existing vehicles is determined as a ghost so that the one of the actually existing vehicles is excluded from a warning target.

Modifications

The exemplary embodiment of the present disclosure has been described. The present disclosure is not limited to the above exemplary embodiment, and therefore can be embodied while variously modified.

The exemplary embodiment selects, from one or more extracted vehicles detected in the left irradiation region R311, one extracted vehicle, and selects, from one or more extracted vehicles detected in the right irradiation region R321. Then, the exemplary embodiment combines the selected extracted vehicle detected in the left irradiation region R311 with the selected extracted vehicle detected in the right irradiation region R321 to thereby create a vehicle pair of the selected extracted vehicles.

The present disclosure is however not limited to the above configuration that selects one extracted vehicle from one or more extracted vehicles detected in the left irradiation region R311, and selects one extracted vehicle from one or more extracted vehicles detected in the right irradiation region R321.

The present disclosure for example can select one extracted vehicle from one or more extracted vehicles located on the right side of the center line M of the own vehicle 100, select one extracted vehicle from one or more extracted vehicles located on the left side of the center line M of the own vehicle 100, and combine the selected extracted vehicles with one another to thereby create a vehicle pair.

One or more target objects obtained by each of the secondary warning routine and primary warning routine of the exemplary embodiment can include target objects added by an extrapolation task carried out by the corresponding one of the secondary radar module 311 and the primary radar module 321. The extrapolation task carried out by each of the secondary radar module 311 and the primary radar module 321 represents a task that (1) Obtains information about one or more target objects, which have been detected several times by previous target-object recognition processes carried out by the corresponding one of the secondary radar module 311 and the primary radar module 321, but are missed by a current target-object recognition process carried out by the corresponding one of the secondary radar module 311 and the primary radar module 321

(2) Determines, based on the obtained information, the one or more missed target objects which are one or more recognized target objects as one or more extrapolated target objects.

The present disclosure can be configured not to determine that one of extracted vehicles of a vehicle pair is a ghost upon the other of the extracted vehicles being based on an extrapolated target object. For example, the present disclosure can be configured to exclude extracted vehicles representing extrapolated target objects from extracted vehicle candidates that can be selected as a vehicle pair when creating the vehicle pair in step S320 of the ghost determination subroutine.

The primary CPU 322a can be configured to determine whether each target object is an extrapolated target object in accordance with information about the corresponding target object obtained from the secondary radar module 311 or the primary radar module 321.

The above modification based on the extrapolation task makes it possible to reduce a possibility that one of actually existing target objects is determined as a ghost based on an extrapolated target object to thereby prevent the one of the actually existing target objects from being excluded from a warning target, because the extrapolated target object is less likely to actually exist as compared with the actually existing target objects.

The primary CPU 322a can be configured to perform the ghost determination subroutine upon determination that one or more obstacles W are located adjacent to the own vehicle 100. In other words, the primary CPU 322a can be programmed to perform the ghost determination subroutine upon determination that one or more obstacles W, which may cause multipath propagation, are located around the own vehicle 100.

The primary CPU 322a can be configured to determine whether one or more obstacles W are located adjacent to the own vehicle 100 in accordance with determination of whether the one or more obstacles W are located in the left irradiation region R311 using the secondary radar module 311 and are located in the right irradiation region R321 using the primary radar module 321.

The primary CPU 322a can also be configured to determine whether one or more obstacles W are located adjacent to the own vehicle 100 using another detection device, such as a sonar, except for a radar module, and perform the ghost determination subroutine upon determination that the one or more obstacles W are located adjacent to the own vehicle 100.

The secondary radar module 311 of the exemplary embodiment is mounted at the rear left portion of the own vehicle 100, and the primary radar module 321 of the exemplary embodiment is mounted at the rear right portion of the own vehicle 100. The secondary radar module 311 and the primary radar module 321 are not limited to the above respective mount positions. For example, a specific modification of the exemplary embodiment can be configured such that (1) The secondary radar module 311 is mounted at the rear right portion of the own vehicle 100
(2) The primary radar module 321 is mounted at the rear left portion of the own vehicle 100

In other words, the mounted position of each of the secondary radar module 311 and the primary radar module 321 according to the specific modification is opposite to the mounted position of the corresponding one of the secondary radar module 311 and the primary radar module 321 according to the exemplary embodiment.

The distance threshold according to the exemplary embodiment is set to a distance enough for extracted vehicles to pass each other therethrough. For example, the distance threshold according to the exemplary embodiment is set to the width of a standard vehicle, such as the order of 2 meters. The distance threshold can be set to a length shorter than the width of a standard vehicle.

Each of the travel threshold, distance-gap threshold, crossing-time gap threshold, speed-gap threshold, and distance threshold used for the corresponding determination according to the exemplary embodiment can be set to a value previously determined based on previously carried-out experiments. Each of the travel threshold, distance-gap threshold, crossing-time gap threshold, speed-gap threshold, and distance threshold according to the exemplary embodiment can be set to a value determined in consideration of variations in parameters used by the corresponding determination.

The secondary processor 312 and the primary processor 322, each of which is comprised of a microcomputer, are installed in the respective secondary radar 31 and primary radar 32 according to the exemplary embodiment, but these processors, that is, microcomputers, are not limited to be installed in the respective secondary radar 31 and primary radar 32.

Figure 14:
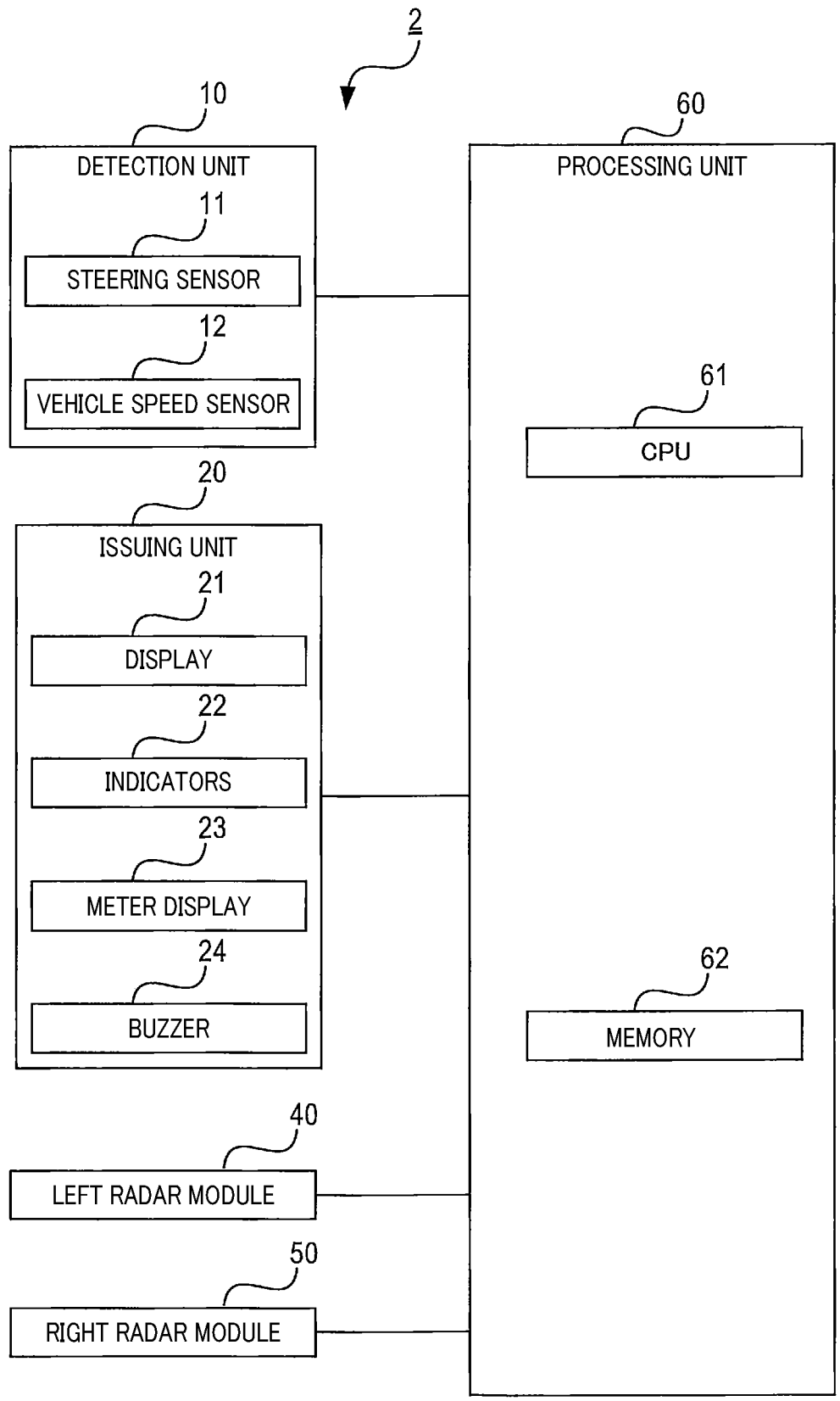
FIG. 14 is a block diagram illustrating the configuration of a warning system according to a modification.

Specifically, as illustrated in FIG. 14, a warning system 2 can include (1) A left radar module 40 equivalent to the secondary radar module 311 of the secondary radar 31
(2) A right radar module 50 equivalent to the primary radar module 321 of the primary radar module 321
(3) A processing unit 60 comprised of the secondary processor 312 and the primary processor 322

That is, the processing unit 60 can be comprised of (i) a CPU 61, which serves as both the secondary CPU 312a and the primary CPU 322a, and (ii) a memory 62, which serves as both the secondary memory 312b and the primary memory 322b.

Specifically, the left radar module 40 and the right radar module 50 can be provided separately from a microcomputer constituting the processing unit 60.

In each of the several figures, automobiles are illustrated as extracted vehicles, but another vehicle, such as bicycles can be included in extracted vehicles. That is, extracted vehicles are not limited to automobiles, and can include various mobile objects, such as bicycles. The various thresholds, such as the travel threshold, distance-gap threshold, crossing-time gap threshold, speed-gap threshold, and distance threshold, can be changed depending on the types of one or more mobile objects as detection targets.

The secondary and primary processors 312 and 322 and their methods described in the present disclosure can be implemented by a dedicated computer including a memory and a processor programmed to perform one or more functions embodied by one or more computer programs.

The secondary and primary processors 312 and 322 and their methods described in the present disclosure can also be implemented by a dedicated computer including a processor comprised of one or more dedicated hardware logic circuits.

The secondary and primary processors 312 and 322 and their methods described in the present disclosure can further be implemented by a dedicated computer system comprised of a memory, a processor programmed to perform one or more functions embodied by one or more computer programs, and one or more hardware logic circuits.

The one or more programs can be stored in a non-transitory storage medium as instructions to be carried out by a processor. The functions of each unit included in each of the secondary and primary processors 312 and 322 can be implemented by software or at least one hardware devices.

The functions of one element in the exemplary embodiment can be distributed as plural elements, and the function of one element can be implemented by plural elements. The functions that plural elements have can be implemented by one element, and the function implemented by plural elements can be implemented by one element. At least part of the structure of the exemplary embodiment can be eliminated. At least part of the exemplary embodiment can be added to the structure of one of the modifications, or can be replaced with a corresponding part of one of the modifications.

The present disclosure can be implemented by various embodiments in addition to the secondary and primary processors 312 and 322; the various embodiments include (i) systems each include the secondary and primary processors 312 and 322, (ii) programs for causing a computer to serve as the secondary and primary processors 312 and 322, (iii) non-transitory storage media storing the programs, and warning methods carried out by the secondary and primary processors 312 and 322.

What is claimed is:

1. A warning apparatus installed in an own vehicle, the warning apparatus comprising:
   an obtaining unit configured to obtain information about first and second target objects that are detected in respective right and left rear regions of the own vehicle by a radar module;
   a warning determiner configured to determine, based on the information about the first and second target objects, whether each of the first and second target objects is a warning candidate about which an issuance of a warning is required;
   an issuing unit configured to perform the issuance of the warning about the warning candidate to a driver of the own vehicle when the own vehicle is reversing;
   a restriction unit configured to:
      determine whether a predetermined restriction condition is satisfied for the first and second target objects;
      determine that, upon determination that the restriction condition is satisfied for the first and second target objects, one of the first and second target objects is a ghost, and the other of the first and second target objects except for the ghost is a warning target that is the warning candidate; and perform restriction of the issuance of the warning about the ghost from the issuing unit;

a trajectory calculator configured to calculate an estimated trajectory of each of the first and second target objects in a rearward region, the rearward region being previously established behind the own vehicle; and a cancelling unit configured to cancel the restriction of the issuance of the warning about the ghost from the issuing unit upon determination that a predetermined cancelation condition is satisfied for the first and second target objects, the cancelation condition including a condition that a passing distance between the first and second target objects is larger than a predetermined distance threshold, the passing distance between the first and second target objects being defined as a minimum distance between the estimated trajectory of the first target object and the estimated trajectory of the second target object.

2. The warning apparatus according to claim 1, wherein: the distance threshold is set to a standard width corresponding to a width of a previously determined vehicle.

3. The warning apparatus according to claim 1, wherein: the cancellation condition includes a condition that the estimated trajectories of the respective first and second target objects do not intersect with one another.

4. The warning apparatus according to claim 1, wherein: the rearward region has a width that corresponds to a width of the own vehicle.

5. The warning apparatus according to claim 1, wherein: the rearward region has a length extending from a rear end of the own vehicle by a longitudinal length of the own vehicle.

6. The warning apparatus according to claim 1, further comprising:

an estimator configured to calculate an estimated crossing time of each of the first and second target objects, the estimated crossing time of each of the first and second target vehicles representing a time required for the corresponding one of the first and second target objects to reach the rearward region, the cancellation condition including a condition that a selected one of the estimated crossing times of the first and second target objects is lower than or equal to a predetermined avoidance threshold.

* * * * *